United States Patent
Han et al.

(10) Patent No.: US 11,302,903 B2
(45) Date of Patent: Apr. 12, 2022

(54) METHOD OF PRODUCING IRON PHOSPHIDE, POSITIVE ELECTRODE FOR LITHIUM SECONDARY BATTERY COMPRISING IRON PHOSPHIDE, AND LITHIUM SECONDARY BATTERY COMPRISING SAME

(71) Applicant: LG CHEM, LTD., Seoul (KR)

(72) Inventors: Suenghoon Han, Daejeon (KR); Jungmi Moon, Daejeon (KR); Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 267 days.

(21) Appl. No.: 16/617,937

(22) PCT Filed: Mar. 25, 2019

(86) PCT No.: PCT/KR2019/003448
§ 371 (c)(1),
(2) Date: Nov. 27, 2019

(87) PCT Pub. No.: WO2019/198949
PCT Pub. Date: Oct. 17, 2019

(65) Prior Publication Data
US 2020/0119331 A1    Apr. 16, 2020

(30) Foreign Application Priority Data

Apr. 10, 2018  (KR) .................. 10-2018-0041628
Jul. 16, 2018   (KR) .................. 10-2018-0082526
(Continued)

(51) Int. Cl.
H01M 4/04     (2006.01)
H01M 10/0525  (2010.01)
(Continued)

(52) U.S. Cl.
CPC .......... *H01M 4/0471* (2013.01); *C01B 25/08* (2013.01); *H01M 4/5805* (2013.01);
(Continued)

(58) Field of Classification Search
CPC .......... H01M 4/0471; H01M 10/0525; H01M 4/5805; H01M 2004/027;
(Continued)

(56) References Cited

U.S. PATENT DOCUMENTS

| 5,091,022 A | 2/1992 | Achikita et al. |
| 2006/0093919 A1 | 5/2006 | Wixom et al. |

(Continued)

FOREIGN PATENT DOCUMENTS

| CN | 101485985 A | 7/2009 |
| CN | 106129375 A | 11/2016 |

(Continued)

OTHER PUBLICATIONS

Agarwal et al., "Synthesis, Characterization and Application of Nano Lepidocrocite and Magnetite in the Degradation of Carbon Tetrachloride", S. Afr. J. Chem., 2011, vol. 64, pp. 218-224.
(Continued)

*Primary Examiner* — Gary D Harris
(74) *Attorney, Agent, or Firm* — Birch, Stewart, Kolasch & Birch, LLP (57) ABSTRACT

A method for preparing iron phosphide (FeP), a positive electrode of a lithium secondary battery including iron phosphide (FeP), for instance, prepared using the method, and a lithium secondary battery including the same. In the lithium secondary battery including the positive electrode using iron phosphide (FeP), the iron phosphide (FeP) adsorbs lithium polysulfide (LiPS) produced during a charge and discharge process of the lithium secondary battery,
(Continued)

which is effective in increasing charge and discharge efficiency and enhancing lifetime properties of the battery.

14 Claims, 6 Drawing Sheets

(30) Foreign Application Priority Data

Mar. 13, 2019 (KR) .................. 10-2019-0028807
Mar. 13, 2019 (KR) .................. 10-2019-0028813

(51) Int. Cl.
*C01B 25/08* (2006.01)
*H01M 4/58* (2010.01)
*H01M 4/02* (2006.01)

(52) U.S. Cl.
CPC .. *H01M 10/0525* (2013.01); *H01M 2004/027* (2013.01); *H01M 2004/028* (2013.01)

(58) Field of Classification Search
CPC ......... H01M 2004/028; H01M 4/1397; H01M 4/136; C01B 25/08; Y02E 60/10
USPC ........................................ 429/209
See application file for complete search history.

(56) References Cited

U.S. PATENT DOCUMENTS

| | | | | |
|---|---|---|---|---|
| 2009/0117466 | A1* | 5/2009 | Zhamu | H01M 4/02 429/231.8 |
| 2009/0148765 | A1* | 6/2009 | Cao | H01M 4/136 429/163 |
| 2010/0071811 | A1* | 3/2010 | Lacasse | H01F 1/15308 148/403 |
| 2013/0065129 | A1 | 3/2013 | Song et al. | |
| 2014/0361226 | A1 | 12/2014 | Takada et al. | |
| 2018/0138503 | A1 | 5/2018 | Kim et al. | |

FOREIGN PATENT DOCUMENTS

| | | |
|---|---|---|
| DE | 197 55 351 A1 | 6/1999 |
| EP | 0 575 190 A2 | 12/1993 |
| JP | 6-2076 A | 1/1994 |
| JP | 2008-518880 A | 6/2008 |
| JP | 2008-176981 A | 7/2008 |
| JP | 5144108 B2 | 2/2013 |
| JP | WO2012/098960 A1 | 6/2014 |
| JP | 2014-225409 A | 12/2014 |
| JP | 6192273 B2 | 9/2017 |
| KR | 10-0270077 B1 | 10/2000 |
| KR | 10-2009-0120058 A | 11/2009 |
| KR | 10-2013-0104225 A | 9/2013 |
| KR | 10-2014-0116397 A | 10/2014 |
| KR | 10-1659800 B1 | 9/2016 |
| KR | 10-2016-0128014 A | 11/2016 |
| KR | 10-2017-0001374 A | 1/2017 |
| KR | 10-2017-0032190 A | 3/2017 |
| WO | WO 2017/109014 A1 | 6/2017 |

OTHER PUBLICATIONS

Bourlinos et al., "One-pot Borohydride Synthesis of Magnetically Modified Lepidocrocite", Chemistry Letters, 2005, vol. 34, No. 5, pp. 666-667.
Gao et al., "High-efficiency hydrogen evolution catalyzed by iron phosphide nanocrystals", RSC Advances, 2016, vol. 6, No. 115, pp. 114430-114435.
International Search Report for PCT/KR2019/003448 dated Jul. 3, 2019.
Jia et al., "Facile one-pot synthesis of lepidocrocite (γ-FeOOH) nanoflakes for water treatment", New J. Chem., 2013, vol. 37, pp. 2551-2556.
Liu et al., "Hydrothermal synthesis and characterization of α-FeOOH and α-Fe$_2$O$_3$ uniform nanocrystallines", Journal of Alloys and Compounds, 2007, vol. 433, pp. 216-220.
Maiti et al., "Phase Evolution and Growth of Iron Oxide Nanoparticles: Effect of Hydrazine Addition During Sonication", Crystal Growth & Design, 2013, vol. 13, pp. 3637-3644.
Ponce-Castañeda et al., "Synthesis of Fe$_2$O$_3$ Species Embedded in a Silica Xerogel Matrix: A Comparative Study", Journal of Sol-Gel Science and Technology, 2002, vol. 25, pp. 29-36.
Yang et al., "Rague-Like FeP Nanocrystal Assembly on Carbon Cloth: An Exceptionally Efficient and Stable Cathode for Hydrogen Evolution", Nanoscale, 2015, vol. 7, pp. 10974-10981.
Bersani et al., "Micro-Raman Investigation of Iron Oxide Films and Powders Produced by Sol-Gel Syntheses", Journal of Raman Spectroscopy, vol. 30, 1999, pp. 355-360.
Tian et al., "Electrochemical Activity of Iron Phosphide Nanoparticles in Hydrogen Evolution Reaction", ACS Catalysis, vol. 6, 2016, pp. 5441-5448.
Huang et al., "Regulating the polysulfide redox conversion by iron phosphide nanocrystals for high-rate and ultrastable lithium-sulfur battery", Nano Energy vol. 51., 2018, pp. 340-348.

* cited by examiner

METHOD OF PRODUCING IRON PHOSPHIDE, POSITIVE ELECTRODE FOR LITHIUM SECONDARY BATTERY COMPRISING IRON PHOSPHIDE, AND LITHIUM SECONDARY BATTERY COMPRISING SAME

This application claims priority to and the benefits of Korean Patent Application No. 10-2018-0041628, filed with the Korean Intellectual Property Office on Apr. 10, 2018 and Korean Patent Application No. 10-2019-0028807, filed with the Korean Intellectual Property Office on Mar. 13, 2019, and Korean Patent Application No. 10-2018-0082526, filed with the Korean Intellectual Property Office on Jul. 16, 2018 and Korean Patent Application No. 10-2019-0028813, filed with the Korean Intellectual Property Office on Mar. 13, 2019, the entire contents of which are incorporated herein by reference.

TECHNICAL FIELD

The present invention relates to a method for preparing iron phosphide (FeP) usable as a positive electrode additive of a lithium secondary battery, a positive electrode for a lithium secondary battery including iron phosphide (FeP) as a positive electrode additive, and a lithium secondary battery having an improved lifetime by being provided with the same.

BACKGROUND ART

Unlike primary batteries that are discharged only once, secondary batteries are an electricity storage device capable of continuous charge and discharge, and have become an important electronic component of portable electronic devices since 1990s. Particularly, since their commercialization by Sony Corporation of Japan in 1992, lithium ion secondary batteries have led the information age as a core component of portable electronic devices such as smart phones, digital cameras and notebook computers.

Recently, with lithium ion secondary batteries further expanding their areas of application, demands thereon have rapidly increased from medium batteries to be used in power supplies of cleaners or power tools and in the fields such as electric bicycles and electric scooters to high capacity batteries used in the fields such as electric vehicles (EV), hybrid electric vehicles (HEV), plug-in hybrid electric vehicles (PHEV), various robots and large electric storage systems (ESS).

However, lithium secondary batteries having most superior properties among secondary batteries available so far also have several problems to be actively used in transportation equipment such as electric vehicles or PHEV, and a biggest problem among these is limitation in the capacity.

A lithium secondary battery is basically formed with materials such as a positive electrode, an electrolyte and a negative electrode, and since positive electrode and negative electrode materials among these determine battery capacity, a lithium ion secondary battery is subject to restrictions in the capacity due to limits in the positive electrode and negative electrode materials. Particularly, secondary batteries to be used in the applications such as electric vehicles and PHEV need to be used as long as possible after charged once, and discharge capacity becomes very important in secondary batteries. One of the biggest limitations in the sale of electric vehicles is that a distance to travel after charged once is much shorter than automobiles with conventional gasoline engines.

Despite much efforts, such capacity limitation in lithium secondary batteries is difficult to completely resolve due to limitations in lithium secondary battery structures and materials. Accordingly, development of a new concept secondary battery that goes beyond existing secondary battery concepts is required in order to fundamentally resolve the capacity problem of lithium secondary batteries.

A lithium-sulfur secondary battery is a new high capacity and low-priced battery system overcoming the capacity limit determined by intercalation/deintercalation reactions of lithium ions to layer-structured metal oxide and graphite, a basic principle of existing lithium ion secondary batteries, and capable of bringing transition metal replacement and cost reduction.

A lithium-sulfur secondary battery may achieve a super high capacity battery system by having theoretical capacity obtained from a conversion reaction of lithium ions and sulfur ($S_8+16Li^++16e^-\rightarrow 8Li_2S$) in a positive electrode reaching 1,675 mAh/g, and using lithium metal (theoretical capacity: 3,860 mAh/g) as a negative electrode. In addition, a discharge voltage is approximately 2.2 V, and therefore, energy density of 2,600 Wh/kg is obtained theoretically based on the amounts of positive electrode and negative electrode active materials. This is a value higher by approximately 6 to 7 times compared to 400 Wh/kg, theoretical energy density of commercialized lithium secondary batteries ($LiCoO_2$/graphite) using layer-structured metal oxide and graphite.

A lithium-sulfur secondary battery has received attention as a new high-capacity, environmental-friendly, and low-priced lithium secondary battery after it is known around 2010 that battery performance may be dramatically improved through forming a nanocomposite, and intensive studies thereon have been conducted globally as a next generation battery system.

One of major problems of a lithium-sulfur secondary battery revealed to date is that sulfur is close to a nonconductor with electrical conductivity of approximately $5.0\times 10^{-14}$ S/cm, and an electrochemical reaction is not readily carried out in an electrode, and actual discharge capacity and voltage are far below theory due to a very large overvoltage. Early researchers have tried to improve performance using methods such as mechanical ball milling of sulfur and carbon or surface coating using carbon, however, there have been no significant effects.

In order to effectively resolve a problem of an electrochemical reaction being limited due to electrical conductivity, particle sizes need to be reduced to several tens of nanometers or less and the surface needs to be treated with a conductive material as in the example of $LiFePO_4$ (electrical conductivity: $10^{-9}$ S/cm to $10^{-10}$ S/cm), one of other positive electrode active materials, and for this, many chemical (melt impregnation into nano-sized porous carbon nanostructures or metal oxide structures), physical methods (high energy ball milling) and the like have been reported.

Another major problem relating to a lithium-sulfur secondary battery is dissolution of lithium polysulfide, an intermediate product of sulfur, in an electrolyte. As discharge progresses, sulfur ($S_8$) continuously reacts with lithium ions and a phase thereof continuously changes like $S_8\rightarrow Li_2S_8\rightarrow(Li_2S_6)\rightarrow Li_2S_4\rightarrow Li_2S_2\rightarrow Li_2S$ and the like, and among these, $Li_2S_8$ or $Li_2S_4$ (lithium polysulfide) having a chain shape with sulfur forming a long line tends to be readily dissolved in general electrolytes used in lithium ion batteries. When such a reaction occurs, not only reversible positive electrode capacity is greatly reduced but also dissolved lithium polysulfide is diffused into a negative electrode causing various side reactions.

Particularly, lithium polysulfide causes a shuttle reaction during charge and discharge processes, and charge and discharge efficiency rapidly decreases therefrom since charge capacity continuously increases. Various methods have been recently proposed in order to resolve such a problem, and the methods may be largely divided into a method of improving an electrolyte, a method of improving a negative electrode surface, and a method of improving positive electrode properties.

The method of improving an electrolyte is a method of suppressing a shuttle reaction to the maximum by suppressing dissolution of polysulfide in an electrolyte using a new electrolyte such as a functional liquid electrolyte, a polymer electrolyte or an ionic liquid having a new composition or controlling a rate of dispersion into a negative electrode through adjusting viscosity and the like.

Studies on controlling a shuttle reaction by improving properties of an SEI formed on a negative electrode surface have been actively conducted, and typically, a method of improving by adding an electrolyte additive such as $LiNO_3$ to form an oxide layer such as $Li_xNO_y$ or $Li_xSO_y$ on a lithium negative electrode surface, a method of forming a thick functional SEI layer on a lithium metal surface, and the like, may be included.

Lastly, the method of improving positive electrode properties may include a method of forming a coating layer on a positive electrode particle surface so as to prevent polysulfide dissolution or a method of adding a porous material capable of capturing dissolved polysulfide, and typically, a method of coating a surface of a positive electrode structure including sulfur particles with a conductive polymer, a method of coating a surface of a positive electrode structure with a lithium ion-conducting metal oxide, a method of adding a porous metal oxide having a large specific surface area and large pores capable of absorbing lithium polysulfide in large quantities to a positive electrode, a method of attaching a functional group capable of adsorbing lithium polysulfide on a carbon structure surface, a method of surrounding sulfur particles using graphene, graphene oxide or the like, and the like, have been proposed.

Despite such efforts that are in progress, there are problems in that such methods are somewhat complicated and the amount of introducible sulfur, an active material, is limited. Accordingly, development of new technologies for resolving such problems multiply, and improving lithium-sulfur battery performance has been required.

DISCLOSURE

Technical Problem

As a result of extensive studies in view of the above, the inventors of the present invention have identified that high purity iron phosphide may be selectively prepared by, while mixing and reacting heat treated iron hydrate and $NaH_2PO_2.H_2O$, controlling the heat treatment temperature and the mixing ratio.

Accordingly, an aspect of the present invention provides a method for preparing high purity iron phosphide through a simple process.

In addition, the inventors of the present invention have identified that, when introducing iron phosphide (FeP) to a positive electrode of a lithium secondary battery in order to resolve a problem of lithium polysulfide elution occurring on a positive electrode side of a lithium-sulfur battery that is one embodiment of a lithium secondary battery and to suppress side reactions with an electrolyte liquid, the above-described problem is resolved and battery performance of the lithium secondary battery may be enhanced, and have completed the present invention.

Accordingly, an aspect of the present invention provides a positive electrode additive for a lithium secondary battery capable of resolving problems caused by lithium polysulfide.

Another aspect of the present invention provides a lithium secondary battery having enhanced battery lifetime properties by being provided with the positive electrode.

TECHNICAL SOLUTION

According to an aspect of present invention, there is provided a method for preparing iron phosphide (FeP) including (1) obtaining iron oxide represented by the following Chemical Formula 1 by heat treating iron hydrate; and (2) mixing the obtained iron oxide and $NaH_2PO_2.H_2O$ and heat treating the resulting mixture.

$Fe_xO_3$ (herein, $1.7 \le x < 2$)      [Chemical Formula 1]

According to another aspect of present invention, there is provided a positive electrode for a lithium secondary battery including iron phosphide (FeP).

According to still another aspect of present invention, there is provided a lithium secondary battery including a positive electrode for a lithium secondary battery including the iron phosphide (FeP); a negative electrode; a separator provided between the positive electrode and the negative electrode; and an electrolyte.

Advantageous Effects

According to the present invention, high purity iron phosphide can be prepared using a simple process including mixing and reacting heat treated iron hydrate and $NaH_2PO_2.H_2O$. Shape and purity of the prepared iron phosphide can be controlled just by, when mixing and reacting the heat treated iron hydrate and the $NaH_2PO_2.H_2O$, controlling the heat treatment temperature and the mixing ratio. In addition, the prepared iron phosphide is capable of enhancing battery lifetime properties and discharge capacity when used as a positive electrode additive of a lithium secondary battery, particularly, a lithium-sulfur battery.

In addition, when using the iron phosphide (FeP) according to the present invention in a positive electrode of a lithium secondary battery, particularly, a lithium-sulfur battery, lithium polysulfide produced during charge and discharge is adsorbed increasing reactivity of the lithium secondary battery positive electrode, and suppressing side reactions with an electrolyte liquid.

In addition, the lithium secondary battery provided with the iron phosphide (FeP)-including positive electrode is capable of obtaining a high capacity battery and stably using sulfur in high loading since sulfur capacity does not decrease, and is capable of enhancing battery stability since problems such as battery short or heat generation do not occur. Moreover, such a lithium secondary battery has advantages of obtaining high charge and discharge efficiency and improving lifetime properties in the battery.

BEST MODE

Hereinafter, the present invention will be described in detail with reference to accompanying drawings so that those skilled in the art readily implement the present invention. However, the present invention may be embodied in various different forms, and is not limited to the present specification.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

The term "composite" used in the present specification means a material combining two or more materials, and exhibiting more effective functions while forming physically and chemically different phases.

A lithium secondary battery means an electrochemical device manufactured by using a material capable of lithium ion intercalation/deintercalation as a negative electrode and a positive electrode, and filling between the negative electrode and the positive electrode with an organic electrolyte liquid or a polymer electrolyte liquid, and producing electric energy through an oxidation/reduction reaction occurring when the lithium ions are intercalated and deintercalated in the positive electrode and the negative electrode, and according to one embodiment of the present invention, the lithium secondary battery may be a lithium-sulfur battery including sulfur as an electrode active material of a positive electrode.

The present invention supplements disadvantages of existing positive electrodes for a lithium secondary battery, and may improve a problem of continuously decreasing reactivity of an electrode caused by lithium polysulfide dissolution and shuttle phenomenon and a problem of decreasing discharge capacity.

Particularly, by the iron phosphide (FeP) being included in a positive electrode of a lithium secondary battery and adsorbing lithium polysulfide in the present invention, the lithium polysulfide is transferred to a negative electrode mitigating a decrease in the lifetime of the lithium secondary battery, and by suppressing reactivity reduced by the lithium polysulfide, discharge capacity of the lithium secondary battery may increase and battery lifetime may be enhanced including the positive electrode.

Method for Preparing Iron Phosphide (FeP)

A method for preparing iron phosphide according to the present invention includes (1) obtaining iron oxide represented by the following Chemical Formula 1 by heat treating iron hydrate, and (2) mixing the obtained iron oxide and $NaH_2PO_2 \cdot H_2O$ and heat treating the resulting mixture. This method has an advantage of preparing iron phosphide having a shape and properties capable of enhancing discharge capacity and lifetime properties when used as a positive electrode additive of a lithium secondary battery, particularly, a lithium-sulfur battery.

$Fe_xO_3$ (herein, $1.7 \leq x < 2$) [Chemical Formula 1]

The iron hydrate may be an aqueous solution type, and may have a concentration of 1.0 M to 2.0 M. When the concentration is less than 1.0 M, a preparation yield of iron phosphide may decrease, and when the concentration is greater than 2.0 M, properties of prepared iron phosphide may not be suitable to be used as a positive electrode additive of a lithium secondary battery. Examples of such iron hydrate may include $Fe(NO_3)_3 \cdot 9H_2O$.

The iron hydrate may further go through pretreatment by drying for 4 hours to 12 hours at 70° C. to 90° C. before the heat treatment of (1) to prepare iron oxide. When the temperature is lower than the above-mentioned temperature or the drying time is shorter, moisture of the iron hydrate, a reactant, may remain in excess, and the moisture may non-uniformly evaporate later while going through the heat treatment process. In this case, particle distribution may become non-uniform while going through the heat treatment process, and iron oxide represented by Chemical Formula 1 may not be synthesized. In addition, when the temperature is higher than the above-mentioned temperature or the drying time is longer, an oxidation reaction by the heat treatment may be partially progressed after moisture of the iron hydrate, a reactant, may all evaporate. In this case, a non-uniform oxidation reaction may occur through the heat treatment process, and the iron oxide may not be synthesized.

The iron hydrate may be heat treated for 12 hours to 24 hours at 140° C. to 160° C. after going through a pretreatment process of drying to produce the iron oxide represented by Chemical Formula 1. When the heat treatment temperature is lower than 140° C. or the time is shorter than the above-mentioned heat treatment time, reaction residue may remain after the heat treatment. In addition, when the heat treatment temperature is higher than 160° C. or the time is longer than the above-mentioned heat treatment time, the produced particles may become larger and developed to an aggregated form, and a stable material such as $Fe_2O_3$ may be produced. Accordingly, it may be difficult to synthesize target iron phosphide even after going through Step (2). Therefore, the temperature and the time are properly controlled in the above-mentioned temperature and time ranges. The drying pretreatment and the heat treatment may be progressed using a convection oven in the air.

The iron hydrate ($Fe(NO_3)_3 \cdot 9H_2O$) goes through the heat treatment to degas $HNO_3$ (g), and produces the iron oxide. The oxidation number of iron in Chemical Formula 1 may have various oxidation numbers depending on the heat treatment time and the temperature, and x may be preferably from $1.7 \leq x < 1.9$ and more preferably from $1.7 \leq x < 1.8$.

The iron oxide represented by Chemical Formula I gone through Step (1) may be mixed and reacted with $NaH_2PO_2 \cdot H_2O$, and then go through a heat treatment process to prepare iron phosphide (Step (2)). The iron oxide and the $NaH_2PO_2 \cdot H_2O$ may be mixed in a weight ratio of 1:1 to 1:2, and when the ratio of the $NaH_2PO_2 \cdot H_2O$ is lower than the above-mentioned range, a phosphorous (P) raw material is insufficient and pure phase iron phosphide (FeP) may not be synthesized. The ratio being higher than the above-mentioned range may cause concern of excessive impurity remaining.

The heat treatment in Step (2) may be conducted at 200° C. to 300° C., preferably at 220° C. to 280° C. and more preferably at 240° C. to 260° C. When the temperature is lower than the above-mentioned heat treatment temperature, $NaH_2PO_2.H_2O$ is not decomposed failing to synthesize iron phosphide, and when the temperature is higher than the above-mentioned temperature, sizes of prepared iron phosphide particles become large, which is not suitable as a positive electrode additive of a lithium secondary battery, and iron phosphide having a different phase other than FeP may be prepared. The heat treatment in Step (2) may be conducted for 1 hour to 3 hours, and preferably for 1.5 hours to 2.5 hours. When the time is shorter than the above-mentioned range, the reaction time is not sufficient failing to prepare iron phosphide having a target phase, and when the time is longer than the above-mentioned range, sizes of synthesized iron phosphide particles become large, which is not suitable as a positive electrode additive of a lithium secondary battery. In addition, the heat treatment of Step (2) may be conducted while controlling a temperature raising rate to a 5° C. to 10° C. range per minute. When the rate is higher than the above-mentioned rate, the reaction may occur rapidly leading to a non-uniform reaction, and when the rate is lower than the above-mentioned rate, the temperature-raising time increases causing concern of iron phosphide particles becoming larger.

The heat treatment in Step (2) may be conducted under the inert gas atmosphere. The inert gas atmosphere may proceed (i) under the inert gas atmosphere in which a gas inside the reactor is substituted with an inert gas, or (ii) while an inert gas continuously inflows and continuously substitutes a gas inside the reactor. In the case of (ii), the flow rate of the inert gas may be, for example, from 1 mL/min to 500 mL/min, specifically from 10 mL/min to 200 mL/min and more specifically from 50 mL/min to 100 mL/min. Herein, the inert gas may be selected from the group consisting of nitrogen, argon, helium and mixtures thereof.

According to one embodiment of the present invention, 80% of more of the iron oxide represented by Chemical Formula 1 may be converted to iron phosphide (FeP) after reacting with $NaH_2PO_2.H_2O$ and then going through the heat treatment under the inert gas atmosphere, and preferably 90% or more thereof may be converted to iron phosphide. According to an XRD analysis result of FIG. 3, synthesis of $Fe_{1.766}O_3$ (iron oxide) that is one embodiment of the present invention may be identified, and from an XRD analysis result of FIG. 4, preparation of iron phosphide (FeP) may be identified.

In the prepared iron phosphide, spherical primary particles may aggregate to form secondary particles. Herein, the primary particles of the iron phosphide may have an average particle diameter in the range of 50 nm to 300 nm and preferably 100 nm to 150 nm. The secondary particles formed by the aggregation of the primary particles of the iron phosphide may be spherical, and the average particle diameter may be in the range from 0.5 µm to 15 µm, preferably from 1 µm to 10 µm, and more preferably from 2 µm to 5 µm. The shape of the iron phosphide may be controlled as necessary by controlling the reaction time, and these may all be used as a positive electrode material of a lithium secondary battery. As the particle diameter of the secondary particle decreases in the above-mentioned range, the iron phosphide is more suitable as a positive electrode material of a lithium secondary battery, and when the particle diameter of the secondary particle is greater than the above-mentioned range, the particle size is too big, which may not be suitable as a positive electrode additive of a lithium secondary battery.

When using iron phosphide prepared using the method for preparing iron phosphide as described above in a lithium secondary battery, particularly, a lithium-sulfur battery, battery performance may be enhanced since lithium polysulfide eluted during charge and discharge of the battery may be adsorbed. In addition, since the method for preparing iron phosphide according to the present invention does not use phosphine ($PH_3$), a toxic gas, in existing iron (Fe) oxides, iron phosphide may be prepared simply and safely. In addition, there is an advantage in that iron phosphide having a target phase may be selectively prepared without producing iron phosphide having a different phase such as $Fe_2P$ or $Fe_3P$.

The iron phosphide prepared using the above-described reaction may be crystalline.

Figure 2:
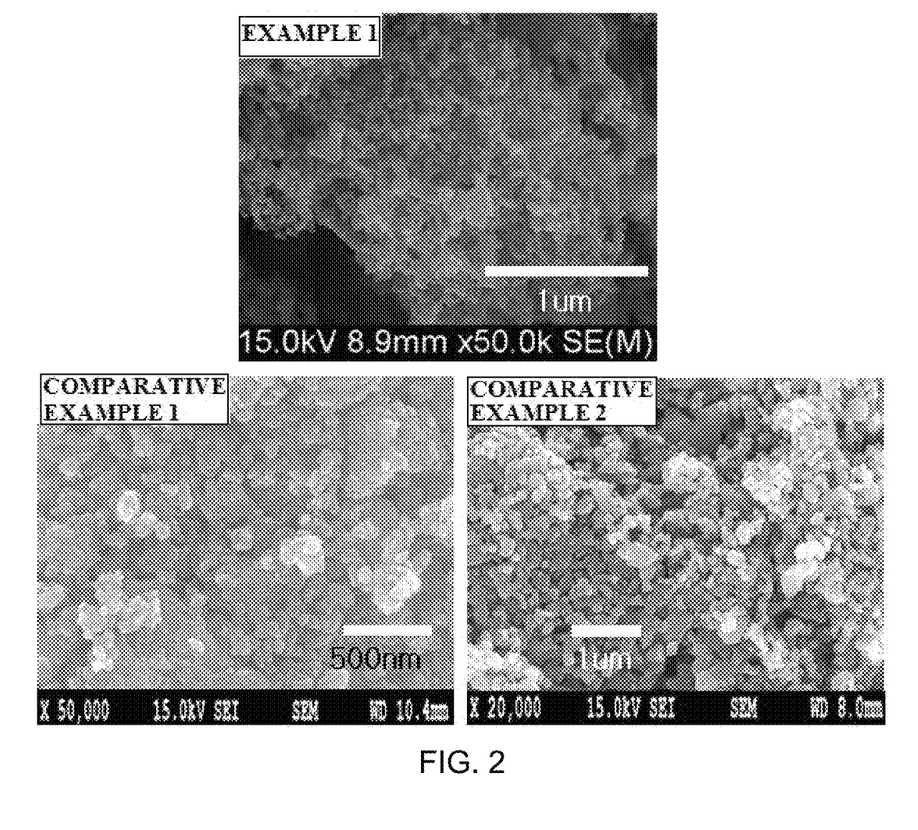
FIG. 2 shows scanning electron microscope (SEM) images of iron phosphides (FeP) according to the present invention.

FIG. 2 shows scanning electron microscope (SEM) images of iron phosphides prepared using the preparation method. FIG. 2 identifies the preparation of spherical iron phosphide prepared according to the preparation method according to the present invention.

Figure 4:
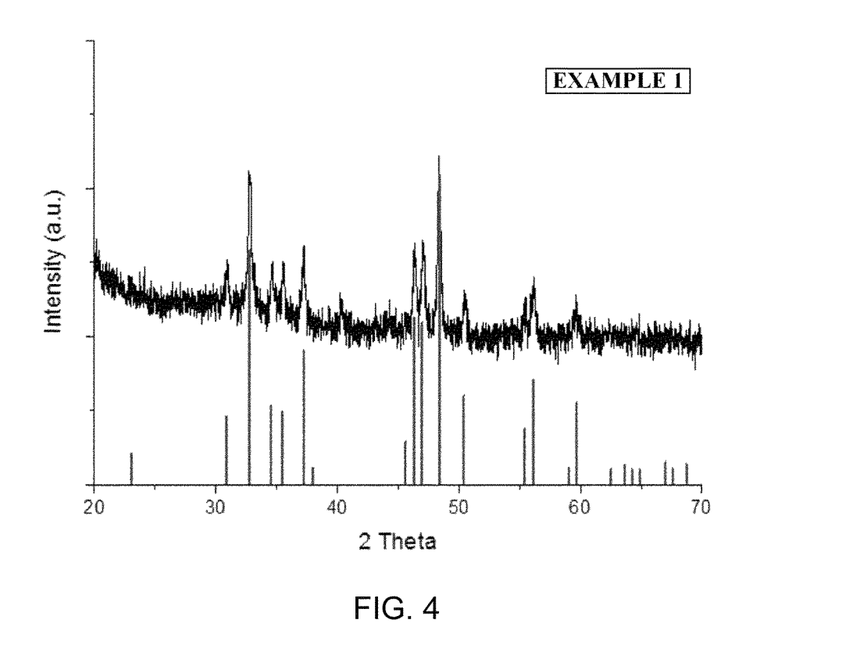
FIG. 4 shows a result of x-ray diffraction (XRD) analysis on iron phosphide (FeP) according to the present invention.

FIG. 4 shows a result of x-ray diffraction (XRD) analysis data on the iron phosphide prepared using the preparation method described above. As a result of the x-ray diffraction analysis of FIG. 4 using CuKα rays, the XRD peaks each appear at 2θ=30.8±0.1°, 32.8±0.1°, 34.6±0.1°, 35.5±0.1°, 37.2±0.1°, 46.3±0.1°, 47.0±0.1°, 48.4±0.1°, 50.4±0.1° and 56.1±0.1°. Through the effective peak detection of FIG. 4, synthesis of iron phosphide may be identified.

The effective (significant) peak in the X-ray diffraction (XRD) analysis means a peak repeatedly detected in substantially the same pattern without being largely affected by analysis conditions or analysts in the XRD data, and in other words, means a peak having height, intensity, strength and the like of 1.5 times or greater, preferably 2 times or greater and more preferably 2.5 times or greater compared to a background level.

Positive Electrode for Lithium Secondary Battery

The present invention provides a positive electrode for a lithium secondary battery including iron phosphide (FeP).

Herein, the positive electrode of a lithium secondary battery may have a base solid including an active material, a conductor and a binder placed on a current collector, and as the current collector, using aluminum, nickel or the like having excellent conductivity may be preferred, and the lithium secondary battery may be a lithium-sulfur battery including sulfur in a positive electrode as an electrode active material.

The iron phosphide content may be from 0.1 parts by weight to 15 parts by weight and preferably from 1 parts by weight to 10 parts by weight based on 100 parts by weight of the based solid included in the positive electrode. When the value is less than the lower limit of the above-mentioned numerical range, a polysulfide adsorption effect may be insignificant, and the value being greater than the upper limit is not preferred since electrode capacity may decrease due to a decrease in the energy density of a battery. As the iron phosphide, iron phosphide prepared using the preparation method provided in the present invention may be used.

Meanwhile, as the active material in the base solid forming the positive electrode of the present invention, elemental sulfur ($S_8$), sulfur series compounds or mixtures thereof may be included, and specific examples of the sulfur series compound may include $Li_2S_n$ (n≥1), organosulfur compounds, carbon-sulfur composites (($C_2S_x)_n$: x=2.5 to 50, n≥2) or the like.

The positive electrode for a lithium secondary battery according to the present invention may preferably include an active material of the sulfur-carbon composite, and since a sulfur material alone does not have electrical conductivity, it may be composited with a conductor when used. Adding the iron phosphide according to the present invention does not affect such sulfur-carbon composite structure retention.

As carbon of the sulfur-carbon composite according to the present invention, those commonly used in the art may be used as long as they have a porous structure or have a high specific surface area. For example, as the porous carbon material, one or more types selected from the group consisting of graphite; graphene; carbon black such as denka black, acetylene black, ketjen black, channel black, furnace black, lamp black or thermal black; carbon nanotubes (CNT) such as single-walled carbon nanotubes (SWCNT) or multi-walled carbon nanotubes (MWCNT); carbon fibers such as graphite nanofibers (GNF), carbon nanofibers (CNF) or activated carbon fibers (ACF); and activated carbon may be included, however, the porous carbon material is not limited thereto. The shape may be a sphere-shape, a rod-shape, a needle-shape, a plate-shape, a tube-shape or a bulk-shape, and those commonly used in a lithium secondary battery may be used without limit.

The active material is preferably employed to form 50 parts by weight to 95 parts by weight and more preferably around 70 parts by weight in 100 parts by weight of the base solid. When the active material is included in less than the above-mentioned range, the electrode reaction is difficult to sufficiently obtain, and when included in greater than the above-mentioned range, a sufficient electrode reaction is difficult to exhibit since amounts of other conductor and binder included are relatively insufficient, and therefore, a proper content is preferably determined within the above-mentioned range.

The conductor in the base solid forming the positive electrode of the present invention is a material performing a role of a path for electrons migrating from a current collector to sulfur by electrically connecting an electrolyte and a positive electrode active material, and is not particularly limited as long as it has porosity and conductivity without inducing chemical changes to a battery. For example, graphite-based materials such as KS6; carbon black such as Super-P, carbon black, denka black, acetylene black, ketjen black, channel black, furnace black, lamp black or thermal black; carbon derivatives such as fullerene; conductive fibers such as carbon fibers or metal fibers; fluorocarbon; metal powders such as aluminum and nickel powder; or conductive polymers such as polyaniline, polythiophene, polyacetylene or polypyrrole may be used either alone or as a mixture.

The conductor is preferably employed to form 1 parts by weight to 10 parts by weight and preferably around 5 parts by weight in 100 parts by weight of the base solid. When the conductor content included in the electrode is less than the above-mentioned range, parts of the sulfur that may not react increase in the electrode ultimately causing a decrease in the capacity, and the content being greater than the above-mentioned range adversely affects high efficiency discharge properties and charge and discharge cycle lifetime, and therefore, a proper content is preferably determined with the above-described range.

The binder as the base solid is a material included for favorably attaching a slurry composition of the base solid forming the positive electrode on a current collector, and materials favorably dissolved in a solvent and favorably forming a conducting network with the positive electrode active material and the conductor are used. Unless particularly limited, all binders known in the art may be used, and preferably, poly(vinyl)acetate, polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride (PVdF), polyhexafluoropropylene, a polyvinylidene fluoride copolymer (product name: Kynar), poly(ethyl acrylate), polytetrafluoroethylene polyvinyl chloride, polytetrafluoroethylene, polyacrylonitri le, polyvinylpyridine, polystyrene, carboxymethylcellulose, siloxane-based such as polydimethylsiloxane, rubber-based binders including styrene-butadiene rubber, acrylonitrile-butadiene rubber and styrene-isoporene rubber, ethylene glycol-based such as polyethylene glycol diacrylate, and derivatives thereof, blends thereof, copolymers thereof and the like may be used. However, the binder is not limited thereto.

The binder is preferably employed to form 1 parts by weight to 10 parts by weight and preferably around 5 parts by weight in 100 parts by weight of the base composition included in the electrode. When the binder content is less than the above-mentioned range, physical properties of the positive electrode decline causing detachment of the active material and the conductor, and when the content is greater than the above-mentioned range, the ratios of the active material and the conductor relatively decrease in the positive electrode causing a decrease in the battery capacity, and therefore, a proper content is preferably determined in the above-described range.

As described above, the positive electrode including iron phosphide and the base solid may be prepared using common methods. For example, slurry is prepared by mixing a solvent, and as necessary, a binder, a conductor and a dispersant to the positive electrode active material and stirring the result, and then the slurry is coated on a current collector made of a metal material, and then the result is compressed and dried to prepare the positive electrode.

For example, when preparing the positive electrode slurry, iron phosphide is dispersed into a solvent first, and the obtained solution is mixed with an active material, a conductor and a binder to obtain a slurry composition for forming a positive electrode. After that, such a slurry composition is coated on a current collector, and the result is dried to complete a positive electrode. Herein, as necessary, extrusion molding may be carried out on the current collector in the preparation for enhancing electrode density. The method of coating the slurry is not limited, and, for example, methods of doctor blade coating, dip coating, gravure coating, slit die coating, spin coating, comma coating, bar coating, reverse roll coating, screen coating, cap coating and the like may be conducted in the preparation.

Herein, as the solvent, those capable of readily dissolving iron phosphide as well as uniformly dispersing the positive electrode active material, the binder and the conductor may be used. As such a solvent, water is most preferred as an aqueous solvent, and herein, the water may be secondary distilled DW (distilled water) or tertiary distilled DIW (deionzied water). However, the solvent is not limited thereto, and lower alcohols capable of being readily mixed with water may be used as necessary. Examples of the lower alcohol may include methanol, ethanol, propanol, isopropanol and butanol, and preferably, these may be mixed with water when used.

Lithium Secondary Battery

Meanwhile, the present invention provides a lithium secondary battery including the positive electrode for a lithium secondary battery including iron phosphide (FeP), a negative electrode, a separator provided between the positive electrode and the negative electrode, and an electrolyte.

Herein, the negative electrode, the separator and the electrolyte may be formed with material that may be commonly used in a lithium secondary battery.

Specifically, the negative electrode may use a material capable of reversibly intercalating or deintercalating lithium ions ($Li^+$), for example, a material capable of reversibly forming a lithium-containing compound by reacting with lithium ions, lithium metal or a lithium alloy as an active material.

Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions may include tin oxide, titanium nitrate or silicon. Examples of the lithium alloy may include alloys of lithium and metals selected from the group consisting of Na, K, Rb, Cs, Fr, Be, Mg, Ca, Sr, Ba, Ra, Al and Sn.

In addition, the negative electrode may selectively further include a binder together with the negative electrode active material. The binder performs a role of making the negative electrode active material to a paste, mutual adhesion between the active materials, adhesion between the active material and a current collector, and having a buffering effect for active material expansion and contraction. Specifically, the binder is the same as described above.

In addition, the negative electrode may further include a current collector for supporting a negative electrode active layer including the negative electrode active material and the binder. The current collector may be selected from the group consisting of copper, aluminum, stainless steel, titanium, silver, palladium, nickel, alloys thereof and combinations thereof. The stainless steel may have its surface treated with carbon, nickel, titanium or silver, and as the alloy, aluminum-cadmium alloys may be used. In addition thereto, baked carbon, nonconductive polymers of which surface is treated with a conductor, conductive polymers or the like may also be used. In addition, the negative electrode may be a thin film of lithium metal.

The separator uses a material separating or insulating the positive electrode and the negative electrode and allowing lithium ion transport therebetween, and is not particularly limited as long as it is commonly used as a separator in a lithium secondary battery, and those having an excellent electrolyte moisture-containing ability while having low resistance for ion migration of the electrolyte are particularly preferred.

More preferably, porous, non-conductive or insulating materials may be used as the separator material, and for example, an independent member such as a film, or a coating layer added to the positive electrode and/or the negative electrode may be used.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone, or as a laminate thereof, or common porous non-woven fabrics, for example, non-woven fabrics made of high melting point glass fiber, polyethylene terephthalate fiber or the like may be used, however, the separator is not limited thereto.

The electrolyte is a non-aqueous electrolyte containing a lithium salt, and is formed with a lithium salt and an electrolyte liquid. As the electrolyte liquid, a non-aqueous organic solvent, an organic solid electrolyte, an inorganic solid electrolyte and the like may be used.

The lithium salt is a material readily dissolved in the non-aqueous electrolyte, and examples thereof may be any one or more selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $LiSO_3CH_3$, LiSCN, $LiC(CF_3SO_2)_3$, $LiN(CF_3SO_2)_2$, chloroborane lithium, lower aliphatic carboxylic acid lithium, lithium tetraphenylborate and lithium imide.

The concentration of the lithium salt may be from 0.2 M to 2 M, preferably from 0.6 M to 2 M and more preferably from 0.7 M to 1.7 M depending on various factors such as an accurate composition of the electrolyte mixture, solubility of the salt, conductivity of the dissolved salt, charge and discharge conditions of a battery, a working temperature, and other factors known in the lithium battery field. When the lithium salt concentration is less than the above-mentioned range, conductivity of the electrolyte may decrease causing decline in the electrolyte performance, and when greater than the above-mentioned range, viscosity of the electrolyte increases leading to a decrease in the lithium ion mobility, and therefore, a proper concentration is preferably selected in the above-described range.

The non-aqueous organic solvent may preferably include, as a material favorably dissolving the lithium salt, aprotic organic solvents such as 1,2-dimethoxyethane, 1,2-diethoxyethane, 1,2-dibutoxyethane, dioxolane (DOL), 1,4-dioxane, tetrahydrofuran, 2-methyltetrahydrofuran, dimethyl carbonate (DMC), diethyl carbonate (DEC), ethylmethyl carbonate (EMC), methylpropyl carbonate (MPC), ethylpropyl carbonate, dipropyl carbonate, butylethyl carbonate, ethyl propanoate (EP), toluene, xylene, dimethyl ether (DME), diethyl ether, triethylene glycol monomethyl ether (TEGME), diglyme, tetraglyme, hexamethyl phosphoric triamide, gamma-butyrolactone (GBL), acetonitrile, propionitrile, ethylene carbonate (EC), propylene carbonate (PC), N-methylpyrrolidone, 3-methyl-2-oxazolidone, acetic acid ester, butyric acid ester and propionic acid ester, dimethylformamide, sulfolane (SL), methylsulfolane, dimethylacetamide, dimethyl sulfoxide, dimethyl sulfate, ethylene glycol diacetate, dimethyl sulfite or ethylene glycol sulfite, and these may be used either alone or in a mixed solvent form of two or more thereof.

As the organic solid electrolyte, polyethylene derivatives, polyethylene oxide derivatives, polypropylene oxide derivatives, phosphoric acid ester polymers, polyalginate lysine, polyester sulfide, polyvinyl alcohol, polyvinylidene fluoride, polymers including ionic dissociation groups, and the like may be preferably used.

As the inorganic solid electrolyte of the present invention, nitrides, halides, sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH or $Li_3PO4$-$Li_2S$—$SiS_2$, and the like, may be preferably used.

As the lithium secondary battery, those commonly used in the art such as a lithium-sulfur battery and a lithium metal battery may be included, and among these, a lithium-sulfur battery best matching the purpose of the present invention may be included as a representative example. The shape of the lithium secondary battery described above is not particularly limited, and examples thereof may include a jelly-roll type, a stack type, a stack-folding type (including stack-Z-folding type) or a lamination-stack type, and among these, a stack-folding type may be preferred. After preparing an electrode assembly having the positive electrode, the separator and the negative electrode consecutively laminated, the electrode assembly is placed in a battery case, the electrolyte liquid is injected to the top of the case, and the result is sealed with a cap plate and a gasket and then assembled to manufacture a lithium secondary battery.

The lithium secondary battery may be divided into a cylinder-type, a square-type, a coin-type, a pouch-type and the like depending on the shape, and may be divided into a bulk type and a thin film type depending on the size. Structures and manufacturing methods of these batteries are widely known in the art, and therefore, detailed descriptions thereon are not included. By the lithium secondary battery according to the present invention formed as described above including iron phosphide, reactivity of the lithium secondary battery positive electrode increases by adsorbing lithium polysulfide produced when charging and discharging the lithium secondary battery, and the lithium secondary battery using the same is effective in increasing discharge capacity and lifetime.

Hereinafter, the present invention will be described in more detail with reference to examples and the like, however, the scope and the contents of the present invention may not be construed as being reduced or limited to the following examples and the like. In addition, when based on the disclosure of the present invention including the following examples, it is obvious that those skilled in the art may readily implement the present invention that is not specifically provided with experimental results, and such variations and modifications also belong to the attached claims.

PREPARATION EXAMPLE 1

Preparation of Iron Oxide

An aqueous 2.0 M $Fe(NO_3)_3 \cdot 9H_2O$ (Sigma-Aldrich) solution was dried for 6 hours at 80° C. in a convection oven (pretreatment process). After that, the result was heat treated for 18 hours at 155° C. in a convection oven to prepare $Fe_{1.766}O_3$.

PREPARATION EXAMPLE 2

Preparation of Iron Oxide

An aqueous 2.0 M $FeCl_3 \cdot 6H_2O$ (Sigma-Aldrich) solution was dried for 6 hours at 80° C. in a convection oven (pretreatment process). After that, the result was heat treated for 18 hours at 155° C. in a convection oven to prepare $Fe_2O_3$.

PREPARATION EXAMPLE 3

Preparation of Iron Oxide

An aqueous 2.0 M $FeSO_4 \cdot 7H_2O$ (Sigma-Aldrich) solution was dried for 6 hours at 80° C. in a convection oven (pretreatment process). After that, the result was heat treated for 18 hours at 155° C. in a convection oven to prepare $Fe_2O_3$.

EXAMPLE 1

Preparation of Iron Phosphide (FeP)

After mixing the iron oxide ($Fe_{1.766}O_3$) prepared in Preparation Example 1 and $NaH_2PO_2 \cdot H_2O$ in a mass ratio of 1:1.5 and reacting the result, heat treatment was progressed for 2 hours at 250° C. while flowing nitrogen gas at a flow rate of 100 mL/min to prepare iron phosphide (FeP). Herein, the temperature raising rate for the heat treatment was 10° C. per minute.

COMPARATIVE EXAMPLE 1

Preparation of Iron Phosphide (FeP)

Iron phosphide (FeP) was prepared in the same manner as in Example 1 except that the iron oxide was changed to $Fe_2O_3$ of Preparation Example 2 from $Fe_{1.766}O_3$.

COMPARATIVE EXAMPLE 2

Preparation of Iron Phosphide (FeP)

Iron phosphide (FeP) was prepared in the same manner as in Example 1 except that the iron oxide was changed to $Fe_2O_3$ of Preparation Example 3 from $Fe_{1.766}O_3$.

EXPERIMENTAL EXAMPLE 1

Scanning Electron Microscope (SEM) Analysis

For the iron oxides each prepared in Preparation Examples 1 to 3 and the iron phosphides each prepared in Example 1, and Comparative Examples I and 2, a SEM analysis (S-4800 FE-SEM manufactured by Hitachi) was conducted.

Figure 1:
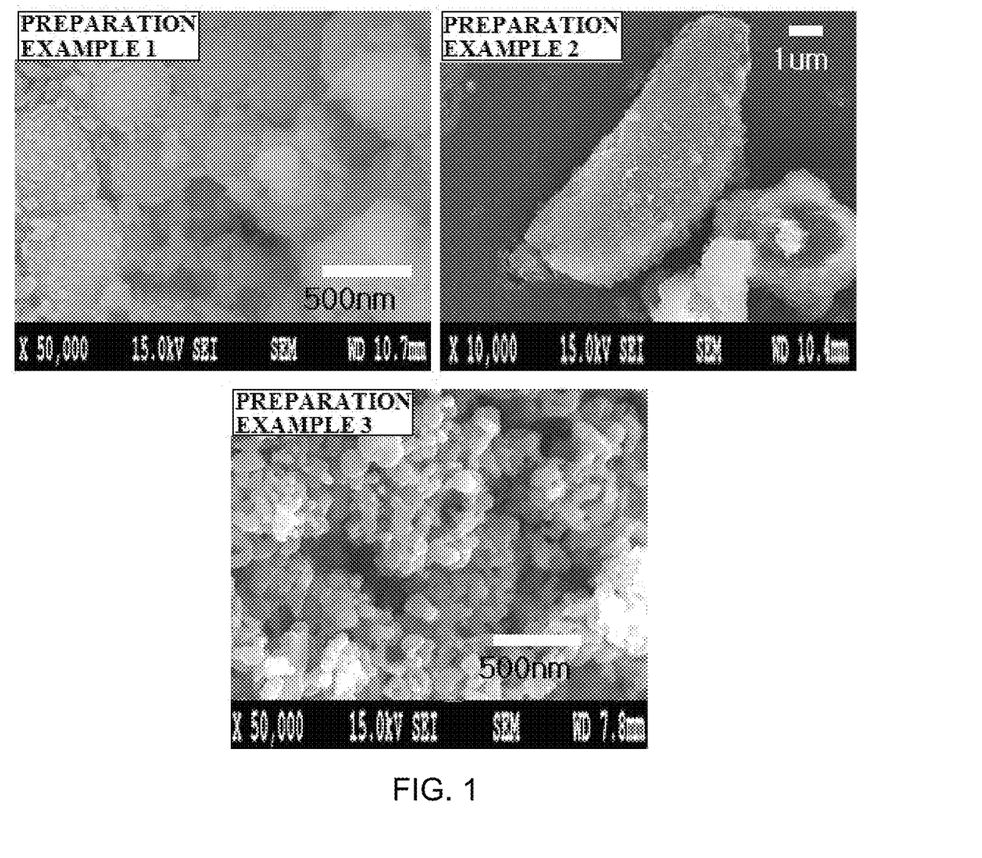
FIG. 1 shows scanning electron microscope (SEM) images of iron oxides according to the present invention.

FIG. 1 shows SEM images for the iron oxides each prepared in the preparation examples, and FIG. 2 shows SEM images for the iron phosphides prepared in Example 1, and Comparative Examples 1 and 2.

As a result of the SEM analysis at a magnitude of 50 k, the iron oxide ($Fe_{1.766}O_3$) of Preparation Example 1 was synthesized as particles of 10 nm to 100 nm, and these aggregated to form secondary particles of 0.5 μm to 5 μm, and the iron phosphide of Example 1 using the iron oxide of Preparation Example 1 was produced as spherical primary particles of approximately 50 nm to 300 nm, and the spherical primary particles aggregated to form secondary particles of 1 μm to 10 μm.

In addition, the iron oxide ($Fe_2O_3$) of Preparation Example 2 was synthesized as particles of 10 nm to 100 nm, and these aggregated to form secondary particles of 5 μm to 20 μm, and the iron phosphide of Comparative Example 1 using the iron oxide of Preparation Example 2 was produced as spherical primary particles of approximately 100 nm to 200 nm, and the spherical primary particles aggregated to form secondary particles of 5 μm to 20 μm.

In addition, it was identified that the iron oxide ($Fe_2O_3$) of Preparation Example 3 was synthesized as particles of 100 nm to 300 nm, and these aggregated to form secondary particles of 1 μm to 10 μm, and the iron phosphide of Comparative Example 2 using the iron oxide of Preparation Example 3 was produced as spherical primary particles of approximately 100 nm to 300 nm, and the spherical primary particles aggregated to form secondary particles of 10 μm to 50 μm.

Experimental Example 2

X-Ray Diffraction (XRD) Analysis

For the iron oxide ($Fe_{1.766}O_3$) prepared in Preparation Example 1 and the iron phosphide prepared in Example 1, an XRD analysis (D4 Endeavor manufactured by Bruker) was conducted.

Figure 3:
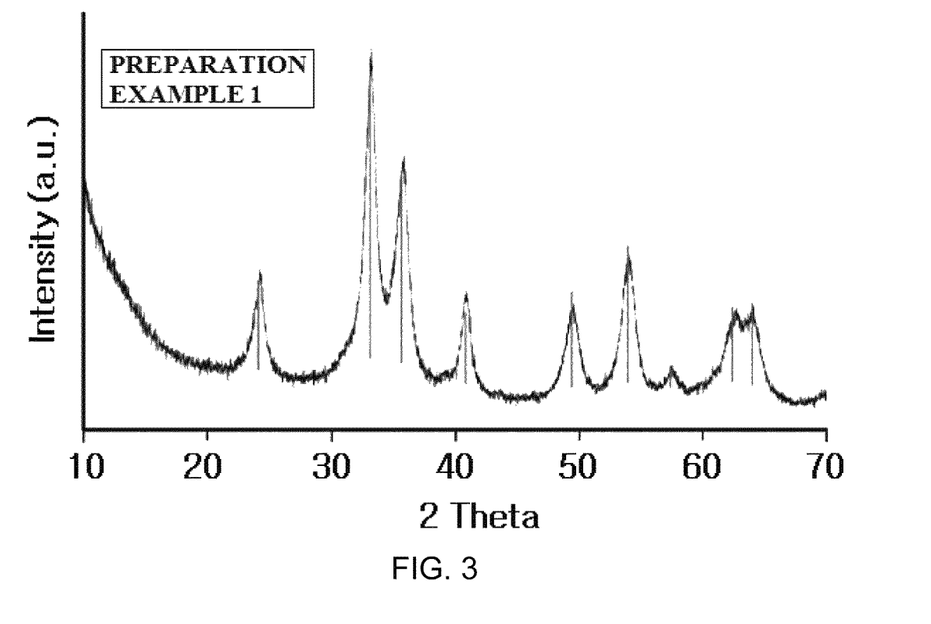
FIG. 3 shows a result of x-ray diffraction (XRD) analysis on $Fe_{1.766}O_3$ according to the present invention.

FIG. 3 is a graph showing a result of XRD analysis on the $Fe_{1.766}O_3$ prepared in the preparation example, and FIG. 4 is a graph showing a result of XRD analysis on the iron phosphide prepared in the example.

Through FIG. 3, preparation of $Fe_{1.766}O_3$ having a higher oxygen content compared to $Fe_2O_3$ having a stable phase was identified, and by identifying the XRD peaks (FIG. 4) of the example, it was seen that pure-phased crystalline iron phosphide (FeP) was selectively prepared.

EXPERIMENTAL EXAMPLE 3

Evaluation on Polysulfide Adsorption Capacity

Figure 5:
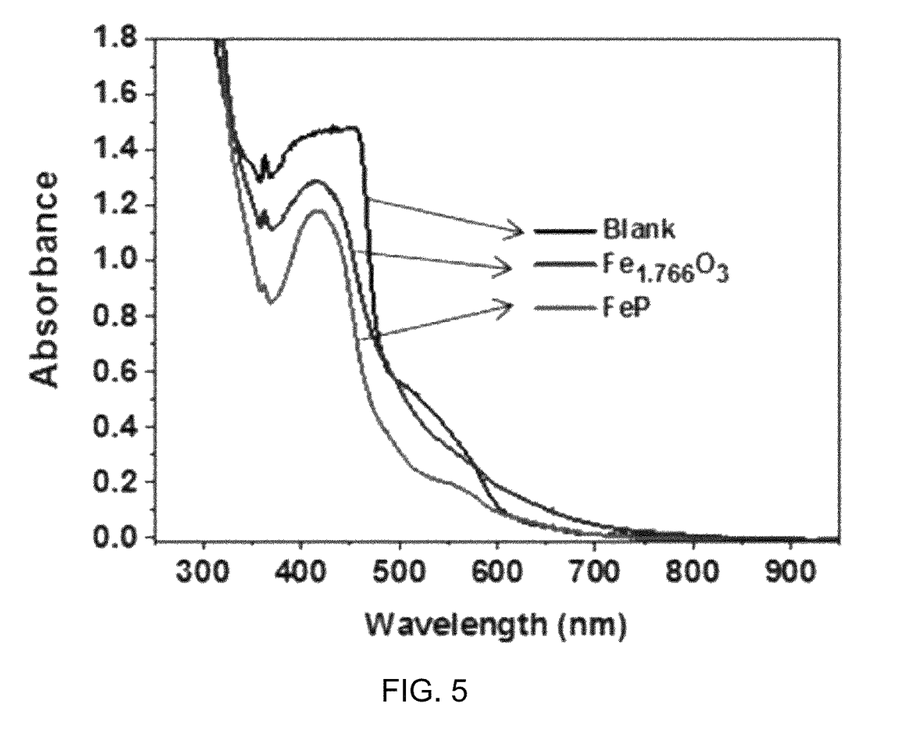
FIG. 5 shows changes in the chromaticity of a lithium polysulfide adsorption reaction according to an example and a comparative example of the present invention as a result of UV absorbance measurement.

Adsorption capacity of the iron oxide ($Fe_{1.766}O_3$) prepared in Preparation Example 1 and the iron phosphide prepared in Example 1 for lithium polysulfide was identified through an ultraviolet (UV, Agilent 8453 UV-visible spectrophotometer manufactured by Agilent) absorbance analysis, and the results are shown in FIG. 5.

When the $Fe_{1.766}O_3$ and the iron phosphide adsorbed lithium polysulfide in a wavelength range of 200 nm to 1000 nm, it was identified that, as shown in FIG. 5, intensity of the ultraviolet absorbance decreased, and it was seen that the iron phosphide of the example had more superior lithium polysulfide adsorption capacity compared to the $Fe_{1.766}O_3$ according to the preparation example.

EXAMPLE 2

Manufacture of Lithium Secondary Battery Including Iron Phosphide-Added Positive Electrode First, the iron phosphide prepared in Example 1 was introduced to water, a solvent, in a content of 10 parts by weight with respect to 100 parts by weight of a base solid, and dissolved therein. After that, to the obtained solution, total 100 parts by weight of the base solid including an active material, a conductor and a binder, that is, 90 parts by weight of a sulfur-carbon composite (S/C 7:3) as the active material, 5 parts by weight of denka black as the conductor, and 5 parts by weight of styrene butadiene rubber/carboxymethylcellulose (SBR/CMC 7:3) as the binder, was introduced, and the result was mixed to prepare a positive electrode slurry composition.

Subsequently, the prepared slurry composition was coated on a current collector (Al foil), and the result was dried for 12 hours at 50° C. to prepare a positive electrode. Herein, the loading amount was 3.5 mAh/cm² and the electrode porosity was 60%.

After that, a coin cell-type lithium secondary battery was manufactured using the prepared positive electrode, a negative electrode, a separator and an electrolyte liquid as follows (the positive electrode was punched as a 14 phi circular electrode, and the polyethylene (PE) separator was punched as 19 phi, and as the negative electrode, 150 μm lithium metal was punched as 16 phi).

COMPARATIVE EXAMPLE 3

Manufacture of Lithium Secondary Battery Including Positive Electrode Without Iron Phosphide Added Thereto A lithium secondary battery was manufactured in the same manner as in Example 2 except that iron phosphide was not introduced to the positive electrode.

COMPARATIVE EXAMPLE 4

Manufacture of Lithium Secondary Battery Including Iron Oxide-Added Positive Electrode A lithium secondary battery was manufactured in the same manner as in Example 2 except that the iron oxide ($Fe_{1.766}O_3$) prepared in Preparation Example 1 was introduced in a content of 10 parts by weight with respect to 100 parts by weight of the base solid instead of the iron phosphide.

COMPARATIVE EXAMPLE 5

Manufacture of Lithium Secondary Battery Including Iron Phosphide-Added Positive Electrode A coin cell-type lithium secondary battery was manufactured in the same manner as in Example 2 except that the iron phosphide prepared in Comparative Example 1 was used in water, a solvent, instead of the iron phosphide prepared in Example 1.

COMPARATIVE EXAMPLE 6

Manufacture of Lithium Secondary Battery Including Iron Phosphide-Added Positive Electrode A coin cell-type lithium secondary battery was manufactured in the same manner as in Example 2 except that the iron phosphide prepared in Comparative Example 2 was used in water, a solvent, instead of the iron phosphide prepared in Example 1.

EXPERIMENTAL EXAMPLE 4

Evaluation on Discharge Capacity of Lithium Secondary Battery

Figure 6:
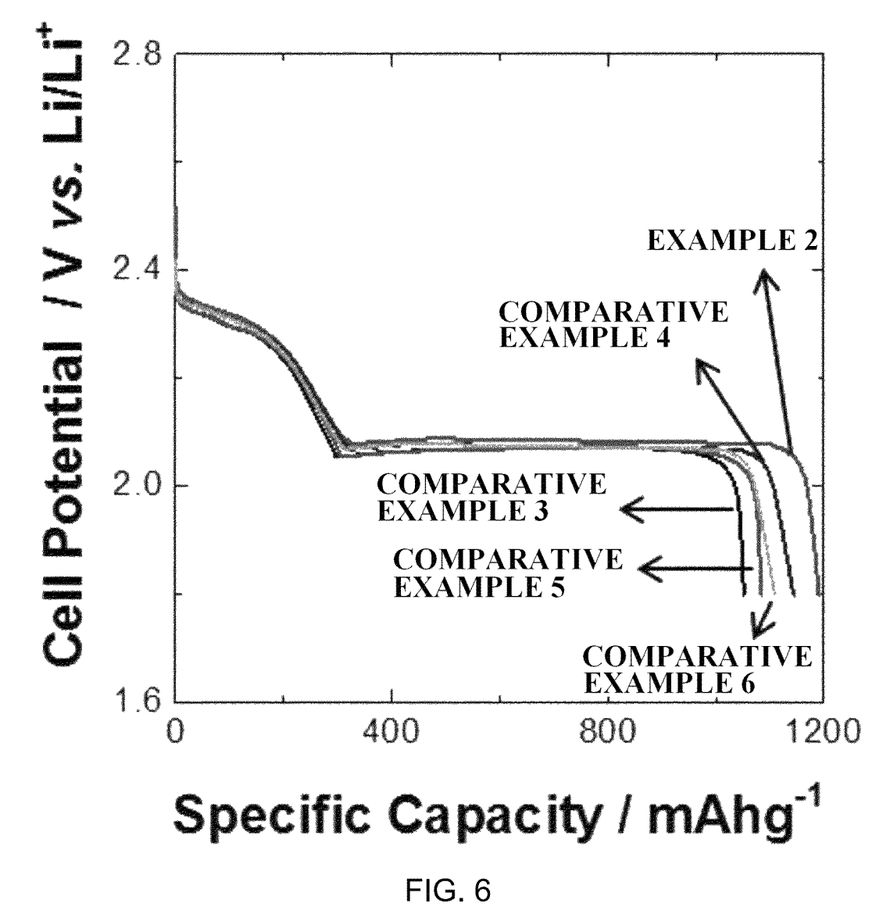
FIG. 6 shows results of measuring discharge capacity of lithium-sulfur batteries including positive electrodes according to examples of the present invention.

In order to test discharge capacity of a lithium secondary battery (lithium-sulfur battery) depending on the positive electrode material types, discharge capacity of each of the lithium secondary batteries (lithium-sulfur batteries) manufactured from Example 2 and Comparative Examples 3 to 6 was measured, and the results are shown in FIG. 6. Herein, the measurement current was 0.1 C, and the voltage range was from 1.8 V to 2.6 V. In addition, positive electrode constitutions of the lithium secondary batteries manufactured from Example 2 and Comparative Examples 3 to 6 are shown in the following Table 1.

TABLE 1

| | Lithium-Sulfur Battery (Positive Electrode) |
|---|---|
| Example 2 | Sulfur-Carbon Composite + Conductor + Binder + Iron Phosphide of Example 1 (Weight Ratio-90:5:5:10) |

TABLE 1-continued

| | Lithium-Sulfur Battery (Positive Electrode) |
|---|---|
| Comparative Example 3 | Sulfur-Carbon Composite + Conductor + Binder (Weight Ratio-90:5:5) |
| Comparative Example 4 | Sulfur-Carbon Composite + Conductor + Binder + $Fe_{1.766}O_3$ of Preparation Example 1 (Weight Ratio-90:5:5:10) |
| Comparative Example 5 | Sulfur-Carbon Composite + Conductor + Binder + Iron Phosphide of Comparative Example 1 (Weight Ratio-90:5:5:10) |
| Comparative Example 6 | Sulfur-Carbon Composite + Conductor + Binder + Iron Phosphide of Comparative Example 2 (Weight Ratio-90:5:5:10) |

As shown in FIG. 6, it was identified that Comparative Example 4 having the iron oxide ($Fe_{1.766}O_3$) of Preparation Example 1 added thereto had higher initial discharge capacity compared to Comparative Example 3 without iron phosphide or iron oxide added thereto, and it was identified that iron phosphide-added Example 2 had initial discharge capacity more increased compared to Comparative Example 4 adding iron oxide. Moreover, it was identified that Example 2 using iron phosphide prepared with the iron oxide ($Fe_{1.766}O_3$) of Preparation Example 1 had significantly superior initial discharge capacity compared to Comparative Examples 5 and 6 using iron phosphide prepared with the iron oxide ($Fe_2O_3$) of Preparation Example 2 or Preparation Example 3. In other words, through results such as above, it can be seen that iron phosphide (FeP), particularly iron phosphide prepared with specific iron oxide ($Fe_{1.766}O_3$), is effective in increasing initial discharge capacity of a lithium-sulfur battery.

EXPERIMENTAL EXAMPLE 5

Evaluation on Lifetime Properties of Lithium Secondary Battery

Figure 7:
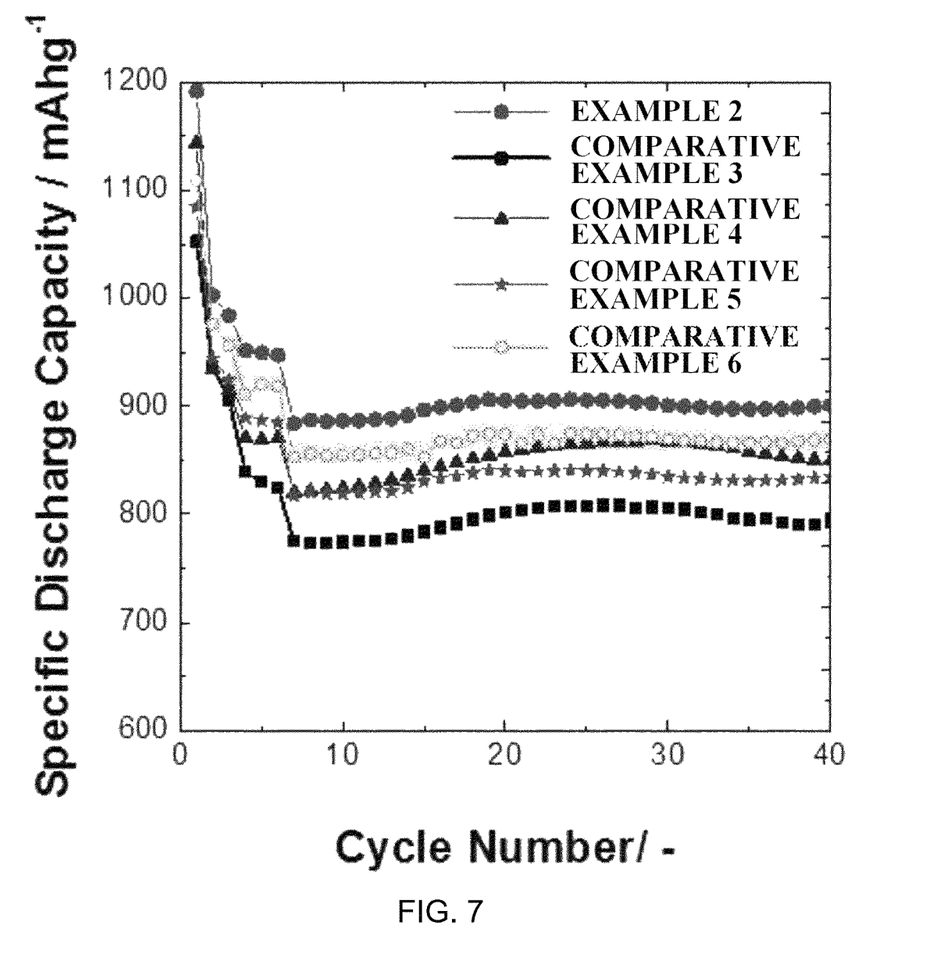
FIG. 7 shows results of measuring lifetime properties of lithium-sulfur batteries including positive electrodes according to examples of the present invention.

In order to test lifetime properties of a lithium secondary battery (lithium-sulfur battery) depending on the positive electrode material types, discharge capacity of each of the lithium secondary batteries (lithium-sulfur batteries) manufactured from Example 2 and Comparative Examples 3 to 6 was measured, and the results are shown in FIG. 7. Herein, the measurement was repeatedly conducted with 0.1 C/0.1 C (charge/discharge) for 2.5 cycles, 0.2 C/0.2 C for 3 cycles, and 0.3 C/0.5 C thereafter.

As shown in FIG. 7, it was seen that the lithium-sulfur battery of Example 2 had higher discharge capacity compared to the lithium-sulfur batteries of Comparative Examples 3 to 6 in 0.1 C, 0.2 C and 0.5 C sections, and lifetime properties were enhanced as well. From such results, it was identified that lifetime inhibiting factors are not caused while having excellent discharge capacity when adding iron phosphide (FeP), particularly, iron phosphide prepared with specific iron oxide ($Fe_{1.766}O_3$), to a positive electrode of a lithium-sulfur battery.

The invention claimed is:

1. A method for preparing iron phosphide, comprising:
   (1) obtaining iron oxide represented by the following Chemical Formula 1 by heat treating iron hydrate, $Fe_xO_3$     [Chemical Formula 1]

wherein, 1.7≤x<2; and
   (2) mixing the obtained iron oxide and $NaH_2PO_2$ $H_2O$ and heat treating the resulting mixture,
   wherein the heat treatment of (1) is progressed for 12 hours to 24 hours at 140° C. to 160° C.

2. The method for preparing iron phosphide of claim 1, wherein the iron hydrate is $Fe(NO_3)_3 \cdot 9H_2O$.

3. The method for preparing iron phosphide of claim 1, further comprising pretreating the iron hydrate by drying the iron hydrate for 4 hours to 12 hours at 70° C. to 90° C. before the heat treatment of (1).

4. The method for preparing iron phosphide of claim 1, wherein the mixing of the iron oxide and $NaH_2PO_2 \cdot H_2O$ of (2) is conducted in a weight ratio of 1:1 to 1:2.

5. The method for preparing iron phosphide of claim 1, wherein the heat treatment of (2) is progressed for 1 hour to 3 hours at 200° C. to 300° C.

6. The method for preparing iron phosphide of claim 1, wherein the heat treatment of (2) is conducted under an inert gas atmosphere or while continuously inflowing an inert gas.

7. A positive electrode for a lithium-sulfur secondary battery comprising iron phosphide.

8. The positive electrode for a lithium-sulfur secondary battery of claim 7, wherein a content of the iron phosphide is from 0.1 parts by weight to 15 parts by weight with respect to 100 parts by weight of a base solid included in the positive electrode, and wherein the base solid comprises an active material, a conductor and a binder.

9. The positive electrode for a lithium-sulfur secondary battery of claim 7, wherein the iron phosphide comprises spherical primary particles, which are aggregated into secondary particles.

10. The positive electrode for a lithium-sulfur secondary battery of claim 9, wherein the primary particles have an average particle diameter in a range of 50 nm to 300 nm.

11. The positive electrode for a lithium-sulfur secondary battery of claim 9, wherein the secondary particles have an average particle diameter in a range of 0.5 μm to 15 μm.

12. The positive electrode for a lithium-sulfur secondary battery of claim 7, wherein the iron phosphide is crystalline.

13. The positive electrode for a lithium-sulfur secondary battery of claim 7, wherein the iron phosphide has XRD peaks each appearing at 2θ=30.8±0.1°, 32.8±0.1°, 34.6±0.1°, 35.5±0.1°, 37.2±0.1°, 46.3±0.1°, 47.0±0.1°, 48.4±0.1°, 50.4±0.1° and 56.1±0.1°.

14. A lithium-sulfur secondary battery comprising:
   the positive electrode for a lithium-sulfur secondary battery of claim 7;
   a negative electrode;
   a separator provided between the positive electrode and the negative electrode; and
   an electrolyte.

* * * * *